US011126038B2

(12) United States Patent
He

(10) Patent No.: US 11,126,038 B2
(45) Date of Patent: Sep. 21, 2021

(54) MANUFACTURING METHOD AND MANUFACTURING APPARATUS FOR DISPLAY PANEL

(71) Applicant: HKC Corporation Limited, Shenzhen (CN)

(72) Inventor: Huailiang He, Shenzhen (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/636,827

(22) PCT Filed: Nov. 7, 2017

(86) PCT No.: PCT/CN2017/109759
§ 371 (c)(1),
(2) Date: Feb. 5, 2020

(87) PCT Pub. No.: WO2019/056516
PCT Pub. Date: Mar. 28, 2019

(65) Prior Publication Data
US 2020/0363685 A1 Nov. 19, 2020

(30) Foreign Application Priority Data
Sep. 25, 2017 (CN) .......................... 201710876478.4

(51) Int. Cl.
G02F 1/133 (2006.01)
G02F 1/1337 (2006.01)
G02F 1/13 (2006.01)
G02F 1/1333 (2006.01)

(52) U.S. Cl.
CPC ...... *G02F 1/133788* (2013.01); *G02F 1/1303* (2013.01); *G02F 1/133351* (2013.01)

(58) Field of Classification Search
CPC ............. G02F 1/133788; G02F 1/1303; G02F 1/133351
USPC .......................................................... 445/24
See application file for complete search history.

(56) References Cited

U.S. PATENT DOCUMENTS

2005/0142465 A1* 6/2005 Park ................... G02F 1/133351 430/7
2010/0328588 A1* 12/2010 Segawa ................. G02F 1/1333 349/106
2017/0307913 A1* 10/2017 Zhao ................. G02F 1/133788
2018/0107073 A1* 4/2018 Ma ..................... G02F 1/133753
2018/0180946 A1* 6/2018 Zhao ..................... G02F 1/1334

FOREIGN PATENT DOCUMENTS

CN 106383421 A 2/2017
CN 105759508 B 3/2019

* cited by examiner

*Primary Examiner* — Christopher M Raabe
(74) *Attorney, Agent, or Firm* — Wang Law Firm, Inc.

(57) ABSTRACT

A manufacturing method and a manufacturing apparatus for a display panel are provided, wherein the manufacturing method include steps of: applying an alignment material on a main substrate; placing a lighting baffle between the main substrate and a light source to control the light transmittance; exposing the main substrate to develop and form an alignment layer; cutting the main substrate to obtain a plurality of display panels.

7 Claims, 6 Drawing Sheets

MANUFACTURING METHOD AND MANUFACTURING APPARATUS FOR DISPLAY PANEL

CROSS-REFERENCE TO RELATED APPLICATION

The present application claims priority to China Patent Application No. 201710876478.4, filed on Sep. 25, 2017, titled "Manufacture method and manufacture apparatus of display panels", which is the international priority application of the present application, the entire content of which is incorporated in the present application by reference.

BACKGROUND OF THE INVENTION

1. Field of the Invention

The present invention relates to the technology of display panels and especially relates to a manufacturing method and a manufacturing apparatus for a display panel.

2. Description of the Related Art

With the continued improvement of technology, liquid-crystal displays have become a mainstream product, broadly used in various applications because of their advantages of a slimmer physical profile, higher energy efficiency, and lower radiation emissions. The majority of liquid-crystal displays are backlit-type, specifically a liquid-crystal panel and a backlight module. The working principles of a liquid-crystal panel are based on orientation control of liquid-crystal molecules located between two parallel glass substrates, controlled by applying a driving voltage on these substrates to refract the light generated by the backlight module to generate images.

Among liquid-crystal displays, the thin film transistor-liquid crystal display (TFT-LCD) is becoming prominent in the display industry because of its lower power consumption, excellent image quality, and better production yield. Thin-film-transistor liquid-crystal displays have become prominent in the display industry due to their low power consumption, excellent image quality, and comparably better production yield. Fundamentally similar, the thin-film-transistor liquid-crystal display includes a liquid-crystal panel and a backlight module, wherein the liquid-crystal panel includes a color filter substrate (CF Substrate), a thin-film-transistor substrate (TFT Substrate), and a mask with a transparent electrode located at the inner side between these substrates. A layer of liquid crystal (LC) molecules is then sandwiched by these two substrates.

The display panel used in a display is generally manufactured by performing an alignment operation followed by cutting a main glass substrate, but a manufacturing factory normally has many products demanding the formation of different pre-tilted angles, each of which corresponding to different light source requirement, especially for different light source intensities. Frequent changes of light sources are therefore required, along with corresponding adjustments to the manufacturing equipment. This process may cause a waste of time resulting in low productivity.

It should be noted that the above description of the background art is merely provided for clear and complete explanation of the techniques of the present invention and for facilitating the understanding by those skilled in the art. It should not be understood that the above technical solution is known to those skilled in the art solely because it is described in the background art section.

SUMMARY OF THE INVENTION

In view of the aforementioned shortcomings of current technology, the technical issue with which the present invention intends to resolve is to provide a display panel manufacturing method and apparatus, which can improve productivity and satisfy the pre-tilt angle requirements.

In order to fulfill the aforementioned purpose, the present invention provides a manufacturing method for a display panel, including steps of:

applying an alignment material on a main substrate;

placing a lighting baffle between the main substrate and a light source to control a light transmittance;

exposing the main substrate to develop and form an alignment layer;

cutting the main substrate to obtain a plurality of display panels.

The present invention also provides a manufacturing apparatus for a display panel, including:

an installation unit configured to hold a main substrate;

a coating unit configured to apply an alignment material;

a light source configured to expose the main substrate to develop and form an alignment layer;

a lighting baffle disposed between the installation unit and the light source, wherein a light transmittance of the lighting baffle can be controlled; and a cutting unit configured to cut the main substrate to obtain a plurality of display panels after the development of the alignment layer is complete.

Following this lighting baffle installation process, the same light source can be used without the need to change and/or adjust the light source, as the light transmittance of the lighting baffle in the present invention can be adjusted to meet the exposure requirements of different display panels. This method of manufacturing can also be used on single-model glass products, as the intensity of the exposure can be actively adjusted to satisfy the needs of the design specifications. On multi-model glass products, the same light source can also be applied on different display panels to acquire different exposure intensities to form their expected pretilt angles because of the existing lighting baffle. This process thereby provides a good solution to the problem of finding the manufacturing parameters of exposure intensity for multi-model glass products. The present invention not only has wide-ranging applications, but it also enables different display panels to acquire demanded exposure intensities to optimize pretilt angles for all products. Therefore, productivity can be improved, and material consumption, adjustment and development costs for light related equipment can be reduced, thereby lowering production costs.

Referring to the specification and figures, specific embodiments of the present invention will be described hereinafter. These embodiments illustrate some applicable ways based on the principle of the present invention. The present invention is however not limited by these embodiments. Rather, the present invention is to cover all changes, modifications, and equivalents falling within the spirit and scope of the appended claims.

The technical description or/and disclosed features in one embodiment can also be identically or similarly used in one or more other embodiments and can be used in combination with the features or to replace the features in other embodiments.

It should be noted that the term "include/comprise" used in the present invention means the presence of the features, elements, steps, or components but does not exclude the presence or addition of one or more other features, elements, steps, or components.

BRIEF DESCRIPTION OF THE DRAWINGS

The accompanying drawings, which are incorporated in and constitute a part of this specification, illustrate and provide better understanding of embodiments of the present invention and, together with the description, serve to explain the principles of the present invention. It is obvious that the drawings in the following description are only some embodiments of the present invention, and those ordinarily skilled in the art may obtain other drawings according to these without making any inventive effort.

DESCRIPTION OF THE PREFERRED EMBODIMENTS

To enable those skilled in the art to better understand the technical solutions of the present invention, the embodiments of the present invention are clearly and completely described below with reference to the accompanying drawings, and, apparently, the described exemplary embodiments merely represent a part of, but not all of, the embodiments of the present invention. Based on the embodiments of the present invention, all other embodiments derived by persons with ordinary skill in the art making no creative effort shall fall within the protection scope of the present invention.

In some embodiments, the display panel adopted in the display apparatus is generally obtained through a main glass substrate undergoing an alignment operation followed by a cutting process. Single-model on glass product is a normally used technique, wherein the alignment operation and cutting process of only one type of display panel is performed on the same batch of main glass substrates, thereby causing a waste of main glass substrates because their low usage rate.

In addition, in multiple products manufacturing, each product requires different formation of pretilt angle corresponding to different light source, especially different light source intensity, for each product, and, therefore, frequently changes of light sources is required. The light changes and the corresponding equipment adjustments will cause a waste of time and result to a low productivity.

The present invention adopts a multi-model on glass method to avoid the serious waste of the display panel material, wherein multiple sizes and pretilt angles of display panels are obtained after cutting a main substrate.

Figure 1:
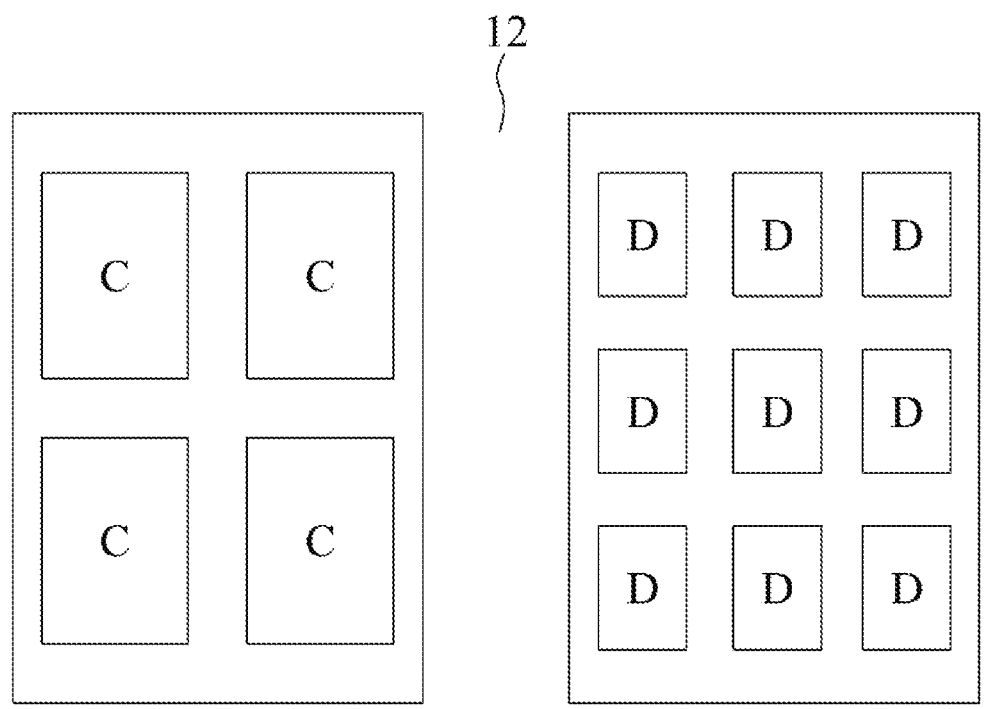
FIG. 1 is a schematic diagram showing a comparison of multi-model on glass and single-model on glass products.
Figure 1:
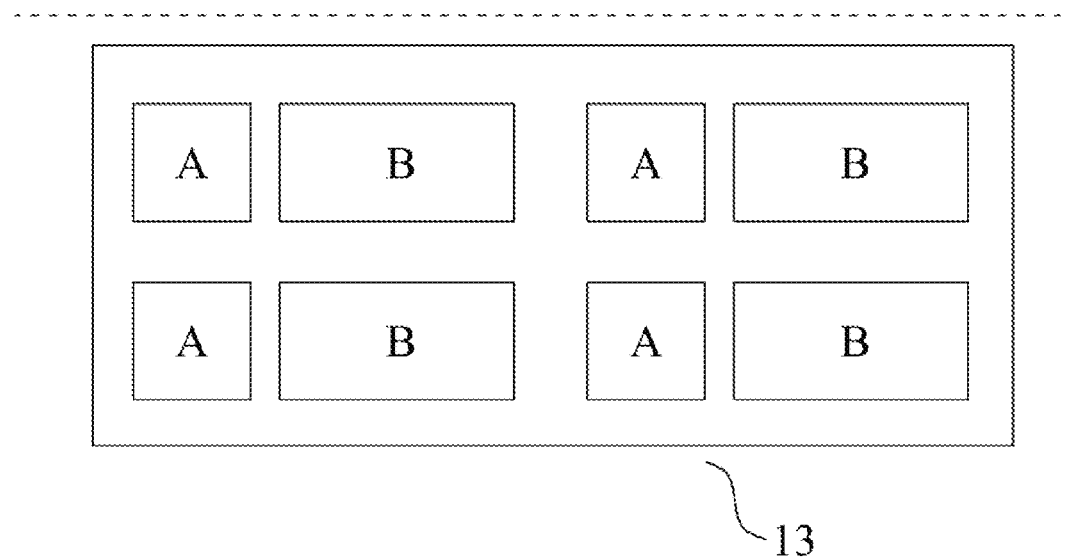

FIG. 1 is a schematic diagram showing a comparison of single-model and multi-model on glass products. The two top diagrams show single-model on glass products 12, and the bottom diagram show a corresponding multi-model on glass product 13. The bottom diagram is abbreviated MMG, (Multi-Model on Glass), wherein multiple sizes and specifications of products are designed and produces from one main substrate. In MMG products, high usage rate of the main substrate reduces waste material, and multiple sizes of products satisfying market demands can be designed, thereby reducing costs.

The difficulty MMG products are facing is that a common set of manufacturing parameters for both products to have best performance is not easily found, or may not be found at all. It is especially present on two products with notable different sizes in aperture ratio (under the same pixels per inch when A product and B product have different sizes, as shown in FIG. 1, the pixel aperture ratio of A is far smaller than the pixel aperture ratio of B). In the condition of a light alignment technique, because A and B receive different amount of UV light exposure under the same manufacturing parameters, the formed pretilt angles are therefore different, and the pretilt angle will directly affect the contrast ratio and response time of the product. The pretilt angle is strongly dependent on the following manufacturing parameters: the properties of liquid crystal, the UV (Ultra Violet) light intensity and exposure time, as well as the voltage difference applied between upper and lower display panels (CF panel and array panel).

Figure 2:
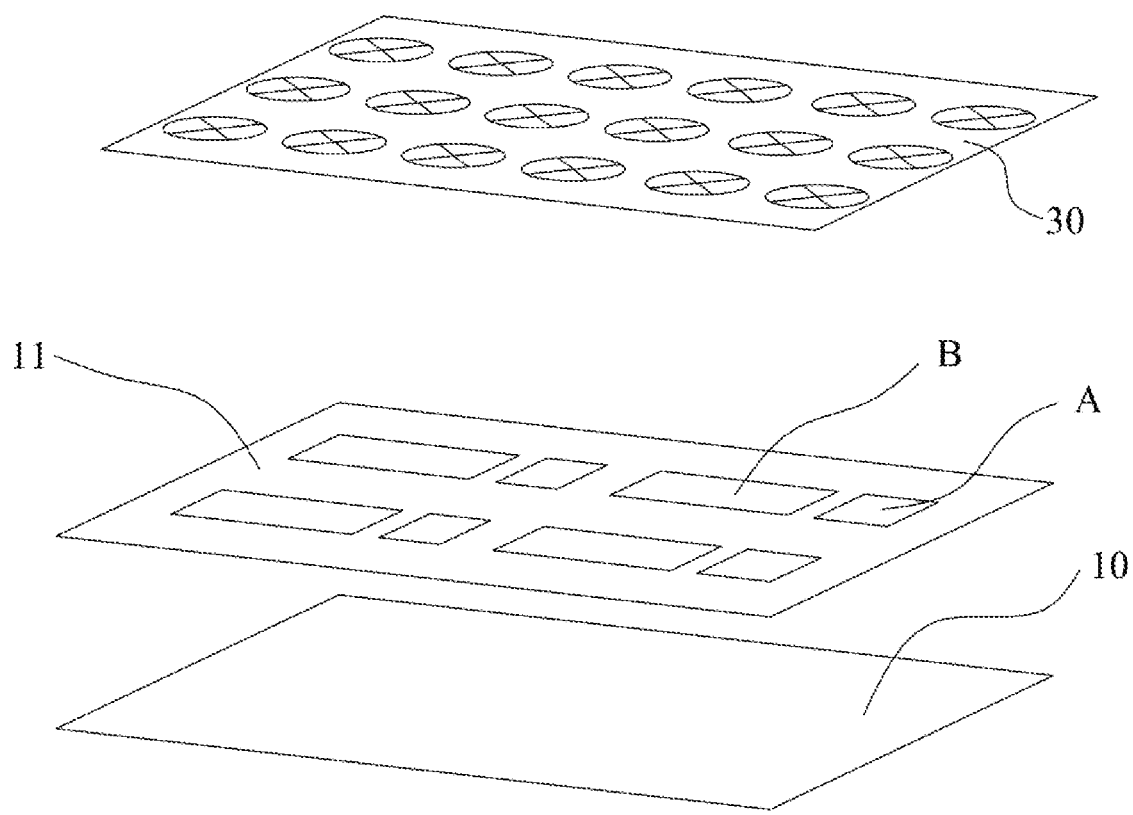
FIG. 2 is a schematic diagram showing a multi-model on glass product.

FIG. 2 is a schematic diagram showing a multi-model on glass product. The two products corresponding to the first region A and the second region B are exposed to the same UV light and receive the same UV exposure intensity, such that the same pretilt angle will be formed. In forming the pretilt angles for PSVA (Polmer Stabilized Vertivally Aligned) products, the UV light applied evenly, and the products all receive the same intensity of light.

If the expected pretilt angles for two products corresponding to the first region A and the second region B are different, the pretilt angles formed on the display panels will not meet the requirements if the same light source is used, because the pretilt angle is strongly related to the light intensity.

In view of this, the present invention provides a manufacturing method and a manufacturing apparatus for a display panel, referring to FIGS. 3-6.

Figure 3:
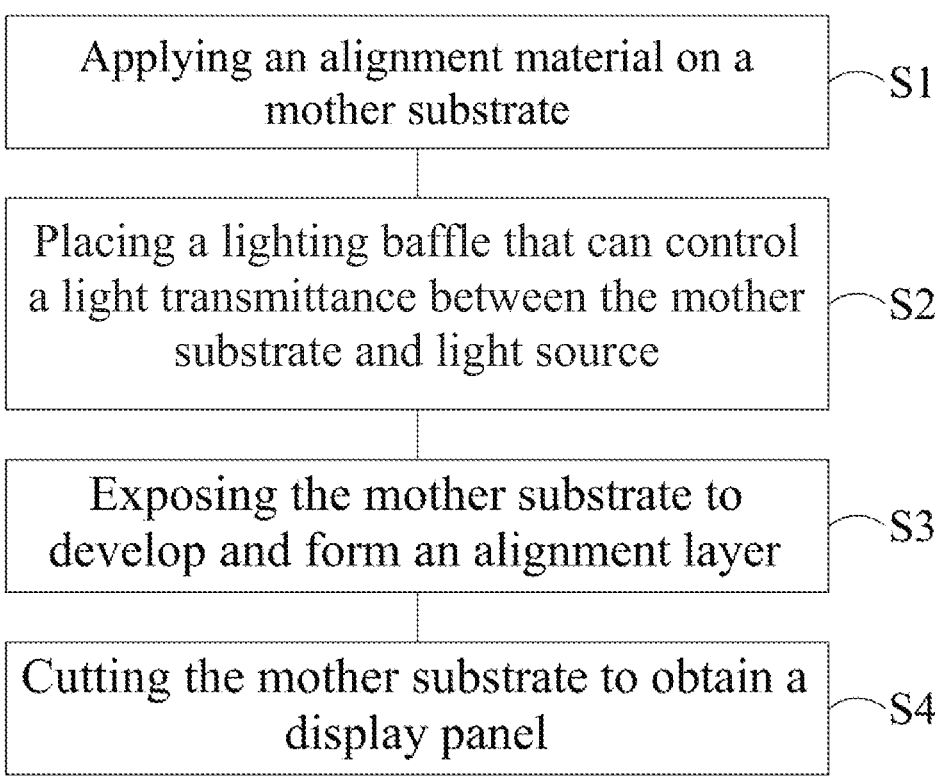
FIG. 3 is a flow chart of a display panel manufacturing method of the present invention.
Figure 4:
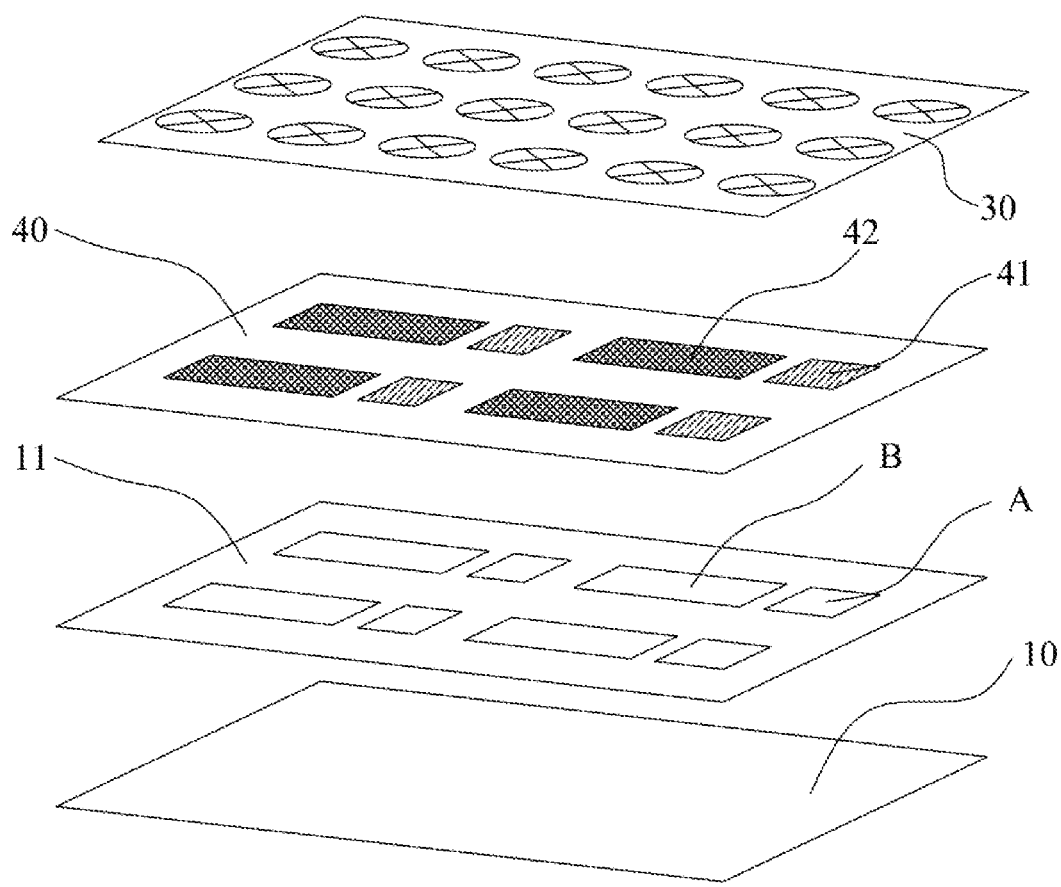
FIG. 4 is a manufacturing schematic diagram of a multi-model on glass product of a display panel of the present invention.
Figure 5:
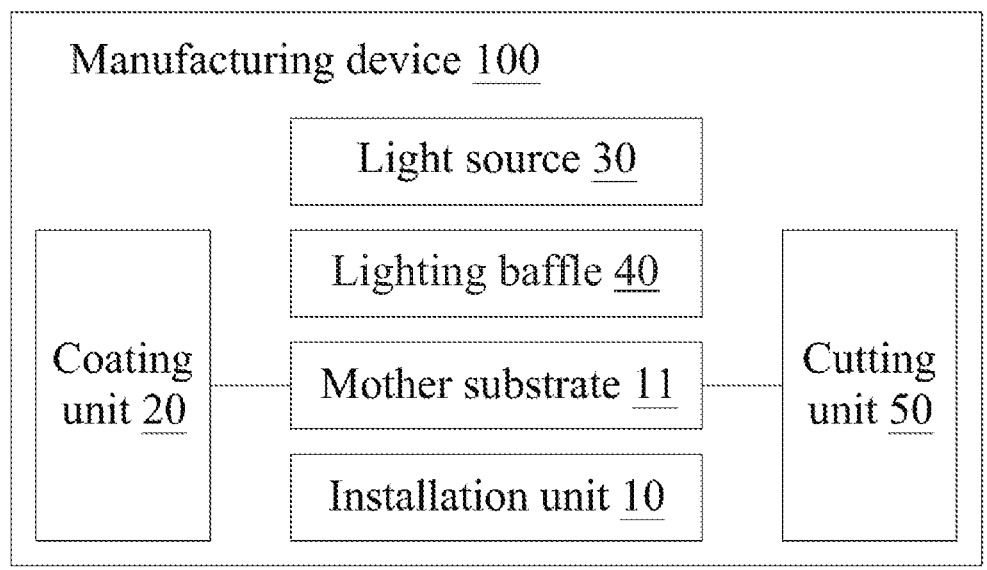
FIG. 5 is a schematic diagram showing a manufacturing apparatus of the present invention.
Figure 6:
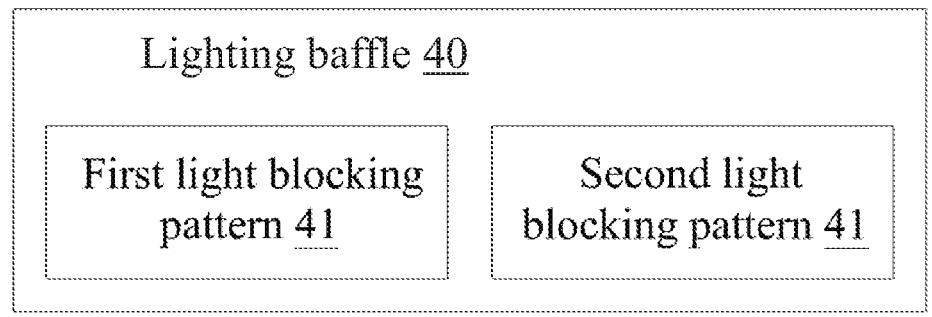
FIG. 6 is a schematic diagram of a lighting baffle.

FIG. 3 is a flow chart of a display panel manufacturing method of the present invention, and, in combination with FIGS. 4-6, the manufacturing method includes the steps of:

S1: applying an alignment material on a main substrate 11;

S2: placing a lighting baffle 40 that controls a light transmittance between the main substrate 11 and a light source 30;

S3: exposing the main substrate to develop and form an alignment layer;

S4: cutting the main substrate 11 to obtain a plurality of display panels.

Following this lighting baffle installation process, the same light source can be used without the need to change and/or adjust the light source, as the light transmittance of the lighting baffle in the present invention can be adjusted to meet the exposure requirements of different display panels. This method of manufacturing can also be used on single-model glass products, as the intensity of the exposure can be actively adjusted to satisfy the needs of the design specifications. On multi-model glass products, the same light source can also be applied on different display panels to acquire different exposure intensities to form their expected pretilt angles because of the existing lighting baffle. This process thereby provides a good solution to the problem of finding the manufacturing parameters of exposure intensity for multi-model glass products. The present invention not only has wide-ranging applications, but it also enables different display panels to acquire demanded exposure intensities to optimize pretilt angles for all products. Therefore, productivity can be improved, and the material consumption, adjustment and development costs for light related equipment can be reduced, thereby lowering production costs.

In the present optional embodiment, a light blocking pattern configured to control the light transmittance is disposed in the lighting baffle, and The lighting baffle is detachable or the light blocking pattern is changeable. In the present technical solution, the lighting baffle can be manufactured to have a fixed light transmittance, being detachable to change to a different lighting baffle to adapt to the production's needs. Certainly, the lighting baffle can also adjust its light transmittance through installing an element such as a light blocking pattern, and, in this case, the light blocking pattern can be changed to one with different light transmittance, size, or shape based on different products to adapt to the production's needs of different display panels. Also, one or more light blocking patterns can be disposed in the lighting baffle.

FIG. 4 is a manufacturing schematic diagram of a multi-model on glass product of a display panel of the present invention. Referring to FIG. 4 in combination with FIG. 3, In the present optional embodiment, the lighting baffle 40 includes at least two different regions (including a first region A and a second region B as shown in the figure). Each of these regions has a corresponding light blocking pattern having different light transmittance disposed on it (that is, a first light blocking pattern 41 is corresponding to the region A and a second light blocking pattern 42 is corresponding to the region B).

The sizes and shapes of the regions can be adjusted through changing the lighting baffle 10 or through changing the light blocking pattern. In the present technical solution, the lighting baffle can have a plurality of regions, each of which have sizes respectively corresponding to the sizes of the display panels to satisfy the needs of multi-model on glass products. If more than two different types of display panels are manufactured at the same time, the sizes, shapes, and light transmittances of the regions can all be adjusted. In an example of a smaller product A and a larger product B, the lighting baffle can be arranged to have two different sizes of regions. It is certain that the light transmittances of the different regions are also corresponding to the display panels.

In the present optional embodiment, the main substrate 11 is divided into different regions corresponding to the different display panels (the first region A and the second region B can be included as shown in the figure). As they are corresponding to different regions, the light blocking patterns have different light transmittances are disposed on the lighting baffle, (that is, the first light blocking pattern is corresponding to region A, and the second light blocking pattern 42 is corresponding to region B).

The light transmittances of the light blocking patterns are configured respectively corresponding to the aperture ratios of the display panels, and a magnitude of light transmittance is inversely proportional to the aperture ratio of the display panel. In the present technical solution, the reason that the lighting baffle is arranged to have different regions is because the main substrate is divided into sections corresponding to different display panels, and the lighting baffle is configured and adjusted based on these sections and the display panels in these sections.

In the present optional embodiment, the main substrate 11 is a main glass substrate, and the lighting baffle 40 is a UV lighting baffle.

Referring to FIG. 5, which is a schematic diagram showing a manufacturing apparatus of the present invention, and in combination with FIGS. 3 and 4, the present invention provides a manufacturing apparatus for a display panel, including:

an installation unit 10 configured to hold a main substrate 11;

a coating unit 20 configured to apply an alignment material;

a light source 30 configured to expose the main substrate 11 to develop and form an alignment layer;

a lighting baffle 40 disposed between the installation unit 10 and the light source 30, wherein a light transmittance of the lighting baffle 40 can be controlled;

a cutting unit 50 configured to cut the main substrate to obtain a plurality of display panels after the development of the alignment layer is complete.

The lighting baffle that controls the light transmittance is equipped so that the manufacturing apparatus provided in the present invention does not require frequent changes or adjustments of the light source, but meets the requirements of different display panels through the adjustment of the light transmittance of the lighting baffle. This method of manufacturing can also be used on single-model glass products, as the intensity of the exposure can be actively adjusted to satisfy the design requirements. On multi-model glass products, the same light source can also be applied on different display panels to acquire different exposure intensities for the formation of their expected pretilt angles because of the existing lighting baffle. This process thereby provides a good solution to the problem of finding the manufacturing parameters of exposure intensity for multi-model glass products. The present invention not only has wide-ranging applications, but it also enables different display panels to acquire demanded exposure intensities to optimize pretilt angles for all products. Therefore, the productivity can be improved, and the material consumption, adjustment and development costs for light related equipment can be reduced, thereby lowering production costs.

Optionally, a light blocking pattern configured to control the light transmittance is disposed in the lighting baffle.

The lighting baffle is detachable or the light blocking pattern is changeable. In the manufacturing apparatus of the present technical solution, the lighting baffle can be manufactured to have a fixed light transmittance, as well as being detachable to change to a different lighting baffle to adapt to the production's needs. The lighting baffle can also adjust its light transmittance through installing an element such as the light blocking pattern, and, in this case, the light blocking pattern can be changed to one with different light transmittance, size, or shape based on different products to adapt to the production's needs of different display panels. Also, one or more light blocking patterns can be disposed in the lighting baffle.

In the present optional embodiment, the lighting baffle includes at least two different regions (including the first region A and the second region B as shown in the figure). Corresponding to these different regions, the light blocking patterns which have different light transmittances are disposed on the lighting baffle (that is, the first light blocking pattern 41 is corresponding to the region A and the second light blocking pattern 42 is corresponding to the region B).

The size and the shape of each one of the regions can be adjusted through changing the lighting baffle or through changing the light blocking pattern. In the manufacturing apparatus of the present technical solution, the lighting baffle can have a plurality of regions, which have sizes respectively corresponding to the sizes of display panels to satisfy the needs of multi-model on glass products (more than two different types of display panels are manufactured at the same time), and the sizes, shapes, and light transmittances of the regions can all be adjusted. In an example including a smaller product A and a larger product B, the lighting baffle can be arranged to have two different sizes of regions. It is certain that the light transmittances of different regions also correspond to the display panels.

In the present optional embodiment, the main substrate is divided into different sections corresponding to different display panels, and, corresponding to different sections, the light blocking patterns have different light transmittances are disposed on the lighting baffle.

The light transmittances of the light blocking patterns are configured to respectively correspond to the aperture ratios of the display panels, and a magnitude of light transmittance is inversely proportional to the aperture ratio of the display panel. In the present technical solution, the reason that the lighting baffle is arranged to have different regions is because the main substrate is divided into sections corresponding to different display panels, and the lighting baffle is configured and adjusted based on these sections and the display panels in these sections.

In the present optional embodiment, the main substrate is a main glass substrate, and the lighting baffle is a UV lighting baffle. In the present technical solution, the main glass substrate can be a main glass substrate, the display panel can be a liquid-crystal display panel, an OLED display panel, or a QLED display panel, and the lighting baffle is generally a UV lighting baffle. Any other types are certainly also included as long as they are applicable.

FIG. 6 is a schematic diagram of a lighting baffle, and referring to FIG. 4 and in combination with FIGS. 1-3, the present invention also provides a lighting baffle that can be used on any one of the disclosed manufacturing methods. The lighting baffle 40 includes at least two different regions, having a first light blocking pattern 41 and a second light blocking pattern 42 with different light transmittances disposed on each one of the regions.

The sizes and shapes of the regions can be adjusted through changing to a different lighting baffle 40 or through changing to different light blocking patterns.

Any one of the disclosed manufacturing methods of the present invention can manufacture the lighting baffle of the present invention. In the manufacturing methods, because the installation of the lighting baffle controls the light transmittance, the light transmittance of the installed lighting baffle can be adjusted to meet the exposure requirements of different display panels, and, therefore, the same light source can be used without the need to change or to adjust the light source. In addition, the manufacturing method can be used on single-model on glass products, wherein the intensity of the exposure can be actively adjusted. The manufacturing method may as well be used on multi-model on glass products, the same light source can also be applied on different display panels to acquire different exposure intensities to form their expected pretilt angles because of the existing lighting baffle. This process thereby provides a good solution to the problem of finding the manufacturing parameters of exposure intensity for multi-model glass products. The present invention not only has wide-ranging applications, but it also enables different display panels to acquire demanded exposure intensities to optimize pretilt angles for all products. Therefore, productivity can be improved, and the material consumption, adjustment and development costs for light related equipment can be reduced, thereby lowering production costs. Wherein, because the light blocking pattern can be changed, distinction marks are no longer used.

The description above provides preferable embodiments of the present invention. It should be noted that many modifications and variations can be acquired based on the concepts of present invention by one skilled in the art making no creative effort. Therefore, any technical feature that can be obtained through logical analysis, inference, or limited experimentation based on the concepts of the present invention by one skilled in the art should be within the scope of the appended claims.

What is claimed is:

1. A manufacturing method for a display panel, comprising steps of:
    applying an alignment material on a main substrate;
    placing a lighting baffle between the main substrate and a light source to control a light transmittance;
    exposing the main substrate to develop and form an alignment layer;
    cutting the main substrate to obtain a plurality of display panels;
    wherein a light blocking pattern configured to control the light transmittance is disposed in the lighting baffle, and
    the lighting baffle is detachable or the light blocking pattern is changeable;
wherein the lighting baffle comprises at least two regions, and the light blocking patterns having different light transmittances are disposed respectively in each one of the regions, and
    a size and a shape of each one of the regions are adjustable through changing the lighting baffle or through changing the light blocking pattern.

2. The manufacturing method for the display panel of claim 1, wherein the main substrate is divided into different sections corresponding to different display panels, and, corresponding to different sections, the light blocking patterns having different light transmittances are disposed on the lighting baffle, and
    the light transmittances for the light blocking patterns are configured to respectively correspond to the aperture ratios of the display panels, and a magnitude of light transmittance is in inversely proportional to the aperture ratio of the display panel.

3. The manufacturing method for the display panel of claim 2, wherein the main substrate is a main glass substrate, and the lighting baffle is a UV lighting baffle.

4. The manufacturing method for the display panel of claim 1, wherein the main substrate is a main glass substrate, and the lighting baffle is a UV lighting baffle.

5. A manufacturing apparatus fora display panel, comprising:
    an installation unit configured to hold a main substrate;
    a coating unit configured to apply an alignment material;
    a light source configured to expose the main substrate to develop and form an alignment layer;
    a lighting baffle disposed between the installation unit and the light source, wherein a light transmittance of the lighting baffle is controllable; and
    a cutting unit configured to cut the main substrate to obtain a plurality of display panels after the development of the alignment layer is complete;

wherein a light blocking pattern configured to control the light transmittance is disposed in the lighting baffle, and the lighting baffle is detachable or the light blocking pattern is changeable;

wherein the lighting baffle comprises at least two regions, and the light blocking patterns having different light transmittances are disposed respectively in each one of the regions, and a size and a shape of each one of the regions are adjustable through changing the lighting baffle or through changing the light blocking pattern.

6. The manufacturing apparatus for the display panel of claim 5, wherein the main substrate is divided into different sections corresponding to different display panels, and, corresponding to different sections, the light blocking patterns which have different light transmittances are disposed on the lighting baffle, and the light transmittances of the light blocking patterns are configured to correspond to the aperture ratios of the display panels, and the magnitude of light transmittance is in inversely proportional to the aperture ratio of the display panel.

7. The manufacturing apparatus for the display panel of claim 5, wherein the main substrate is a main glass substrate, and the lighting baffle is a UV lighting baffle.

* * * * *